Patented Apr. 22, 1941

2,239,626

UNITED STATES PATENT OFFICE 2,239,626

RECOVERY OF NICKEL AND COPPER FROM NICKEL-COPPER MATTES

Helmut Schlecht and Leo Schlecht, Ludwigshafen-on-the-Rhine, Germany, assignors to I. G. Farbenindustrie Aktiengesellschaft, Frankfort-on-the-Main, Germany No Drawing. Application February 15, 1939, Serial No. 256,512. In Germany March 10, 1938

6 Claims. (Cl. 75—72)

The present invention relates to improvements in the recovery of nickel and copper from nickel-copper mattes.

It is already known that nickel may be recovered from nickel-copper mattes by dissolving it from the mattes by the action of suitable liquids, such as acids or salt solutions. Difficulties are often encountered, however, because the nickel, in particular the last traces thereof, reacts only slowly.

We have now found that the solubility and reactivity of the nickel in nickel-copper mattes can be considerably increased by subjecting the nickel-copper matte to a long lasting heat-treatment, advantageously between about 400° and 900°, preferably at about 700° C. It has been found that the reactivity of the nickel contained in nickel-copper mattes is with the same chemical composition, strongly dependent on the thermal influences to which the mattes were exposed.

A favourable thermal treatment consists in annealing the matte at about 700° C. for a long time, as for example 24 hours. The procedure may be that the matte coming from the converter and cooled to ordinary temperature is heated up to the said temperature or the matte may be cooled from the blowing temperature in the converter only to 700° C. and then annealed at the said temperature. At temperatures below 700°, for example at 500° C., longer times of treatment are necessary. When using higher temperatures, as for example 900° C., the time of treatment may be shorter. On the other hand the nickel in mattes which have been annealed at temperatures of about 1000° and 1100° C. is very slow to react.

The nickel-copper matte should preferably contain only such an amount of sulphur that the copper is completely combined as cuprous sulphide; in this case the ratio of copper to sulphur is equal to or greater than 4:1. After the thermal treatment of such a matte, practically all of the nickel is present in the form of metal and not as nickel sulphide. In the case of mattes in which the ratio of copper to sulphur is less than 4:1, however, the thermal treatment also leads to an increase in the reactivity.

The thermal treatment increases the reactivity of the nickel not only in respect of acids or salt solutions, such as hydrochloric acid, sulphuric acid or cupric chloride, but also in respect of solutions of metal salts from which the nickel passing into the solution precipitates the corresponding metal. Also in the reaction of the nickel contained in the matte with carbon monoxide or chlorine, the yield of nickel carbonyl or nickel chloride is considerably increased by the said thermal treatment.

The following examples will further illustrate the nature of this invention but the invention is not restricted to these examples. The parts are by weight.

Example 1

Nickel-copper matte containing 43.67 per cent of nickel, 43.35 per cent of copper and 8.62 per cent of sulphur is ground and heated for 12 hours at 900° C. 50 parts of the matte are then stirred with 165 parts of 20 per cent hydrochloric acid. There thus remain as residue 30 parts in which are contained practically the whole amount of copper and 11.6 per cent of nickel. On the other hand 83.5 per cent of the nickel used have passed into solution.

If the nickel-copper matte be heated for 24 hours at 700° C., there are dissolved from 50 parts of the matte thus treated by the same treatment with 165 parts of 20 per cent hydrochloric acid, 95.1 per cent of the nickel, the whole amount of the copper also remaining practically unattacked.

Example 2

21 parts of the nickel-copper matte described in Example 1 are first heated for 24 hours at 700° C. while excluding air and then treated for 6 hours at 200° C. with carbon monoxide under a pressure of 200 atmospheres. There remains a residue of 12.3 parts having a nickel content of only 4.0 per cent. Thus 94.3 per cent of the nickel volatilizes as carbonyl. If the pretreatment at 700° C. be omitted, there remain 13.5 parts of residue having a nickel content of 19.26 per cent. Thus only 69.3 per cent of the nickel used volatilizes.

Example 3

35 parts of nickel-copper matte having a content of 43.67 per cent of nickel, 45.35 per cent of copper and 8.62 per cent of sulphur are subjected to a thermal treatment at 700° C. for 24 hours and then stirred while hot with 100 parts of a solution of copper chloride and nickel chloride containing 99 grams of copper and 120 grams of nickel per liter. After 3 hours, the copper in the solution has been precipitated down to 4.4 per cent, the nickel content of the matte has been dissolved to a great extent.

If the pretreatment of the matte be omitted, only 49.9 per cent of the copper present in the solution are precipitated under the same conditions.

What we claim is:

1. The process of working up nickel-copper mattes by chemically converting the nickel content and extracting it from the matte which comprises subjecting the matte before the chemical action to a long lasting heat-treatment under substantially non-oxidizing and non-reducing conditions at temperatures between about 400° and 900° C. whereby the reactivity of the nickel with the extracting agent is considerably enhanced.

2. The process of working up nickel-copper mattes by chemically converting the nickel content and extracting it from the matte which comprises subjecting the matte before the chemical action to a long lasting heat-treatment under substantially non-oxidizing and non-reducing conditions at about 700° whereby the reactivity of the nickel with the extracting agent is considerably enhanced.

3. The process of working up nickel-copper mattes by chemically converting the nickel content and extracting it from the matte which comprises subjecting the matte before the chemical action to a heat-treatment under substantially non-oxidizing and non-reducing conditions at temperatures of about 700° to 900° C. for about 12 to 24 hours whereby the reactivity of the nickel with the extracting agent is considerably enhanced.

4. The process as defined in claim 1 wherein the nickel-copper matte employed as initial material contains copper and sulfur in the ratio of at least 4 to 1.

5. The process as defined in claim 2 wherein the nickel-copper matte employed as initial material contains copper and sulfur in the ratio of at least 4 to 1.

6. The process as defined in claim 3 wherein the nickel-copper matte employed as initial material contains copper and sulfur in the ratio of at least 4 to 1.

HELMUT SCHLECHT.
LEO SCHLECHT.